United States Patent
Chen (10) Patent No.: US 9,982,140 B2
(45) Date of Patent: May 29, 2018

(54) INORGANIC-ORGANIC HYBRID OXIDE POLYMER AND MANUFACTURING METHOD THEREOF

(71) Applicant: National Tsing Hua University, Hsinchu (TW)

(72) Inventor: Hsueh-Shih Chen, Hsinchu (TW)

(73) Assignee: National Tsing Hua University, Hsinchu (TW)

(*) Notice: Subject to any disclaimer, the term of this patent is extended or adjusted under 35 U.S.C. 154(b) by 88 days.

(21) Appl. No.: 14/618,366

(22) Filed: Feb. 10, 2015

(65) Prior Publication Data
US 2016/0075884 A1   Mar. 17, 2016

(30) Foreign Application Priority Data

Feb. 10, 2014   (TW) .............................. 103104223 A (51) Int. Cl.
*B05D 1/00*   (2006.01)
*C09D 5/00*   (2006.01)
*C08G 83/00*   (2006.01)

(52) U.S. Cl.
CPC ............. *C09D 5/00* (2013.01); *C08G 83/001* (2013.01)

(58) Field of Classification Search
CPC ......... C08G 83/001; C09D 5/00; B05D 1/005
See application file for complete search history.

(56) References Cited

U.S. PATENT DOCUMENTS

| | | | |
|---|---|---|---|
| 6,613,234 B2* | 9/2003 | Voute ................ | B01D 15/1807 210/198.2 |
| 8,632,883 B2* | 1/2014 | Larsson .................. | B01J 20/06 428/402 |

OTHER PUBLICATIONS

Hsueh-Shih Chen, Sheng-Hsin Huang, and Tsong-Pyng Perng; Preparation and Characterization of Molecularly Homogeneous Silica-Titania Film by Sol-Gel Process with Different Synthetic Strategies; Applied Materials & Interfaces, 2012 American Chemical Society; online e-paper; x.doi.org/10.1021/am301113a | ACS Appl. Mater. Interfaces 2012, 4, pp. 5188-5195; published and available online on Aug. 30, 2012.

Hsueh-Shih Chen, Sheng-Hsin Huang, and Tsong-Pyng Perng; Highly transparent hard bio-coating synthesized by low temperature sol-gel process; Surface & Coatings Technology 233 (2013) 140-146; online e-paper: http://dx.doi.org/10.1016/j.surfcoat.2013.04.023; published and Available online Apr. 13, 2013.

* cited by examiner

*Primary Examiner* — Irina S Zemel
(74) *Attorney, Agent, or Firm* — patenttm.us (57) ABSTRACT

An inorganic-organic hybrid oxide polymer is provided. The polymer consists of an inorganic molecular cluster $M_xN_yO_z$ and an organic molecular polymer cluster OG, wherein the inorganic molecular cluster $M_xN_yO_z$ consists of a hybrid oxidation based on a first element M and a second element N and has a molecular formula $M_xN_yO_z$, wherein $x=0.01\sim0.99$, $y=0.01\sim0.99$, $z/(x+y)=0.01\sim3.99$, and the inorganic molecular cluster $M_xN_yO_z$ has a plurality of voids having an averaged characteristic dimension in a range between 0.2 nm~30 nm and filled with the organic molecular polymer cluster OG, wherein the first element M and the second element N are respectively selected from a group consisting of an intermediate element, a metal element, a semiconductor element and a combination thereof and the first element M is different from the second element N.

7 Claims, 8 Drawing Sheets

INORGANIC-ORGANIC HYBRID OXIDE POLYMER AND MANUFACTURING METHOD THEREOF

FIELD

The present invention relates to an inorganic-organic hybrid oxide polymer and a manufacturing method thereof, in particular to a polymer based on a silicon titanium hybrid oxide and organic molecules and a manufacturing method thereof.

BACKGROUND

In nowadays, the silica-titania hybrid film is widely applied in the optics field and usually acts as, for example, a high refractive index film, an optical waveguide component, an nonlinear optical material and various different kinds of optical protective layers. The conventional methods for manufacturing various silica-titania films include an evaporation scheme, a sputtering scheme, a chemical vapor deposition (CVD) scheme, a plasma enhanced chemical vapor deposition (PECVD) scheme, an atomic layer deposition (ALD) scheme and the like.

No matter which kind method is selected to manufacture the above-mentioned hybrid film, the uniformity issue of mixed silicon dioxide ($SiO_2$) and titanium dioxide ($TiO_2$) molecules and the issue how to ensure a good interfacial adhesion between the molecules will happen. Moreover, the vacuum systems are required of the embodiments of above mentioned methods which the processing equipment cost is relatively high, and the large-scale production is difficult. Furthermore, the coating ability of the vapor deposition or sputtering on a porous substrate is poor, and the disadvantages of chemical vapor deposition are high reaction temperatures and it will possibly damage the substrates.

For the aforementioned reasons, the synthetic ways to manufacture the hybrid films were gradually developed. One of it is to take advantage of a sol-gel reaction process and in conjunction with the appropriate organic molecular materials as the interfacial adhesion between the colloidal particles to prepare organic/inorganic polymer hybrid materials. The advantages of Sol-gel method are high purity, good chemical uniformity, easy to control the constituent ratio, able to be coated on large and complex substrate, the process is simple and the process temperature is low, the production dimensions is large, low manufacturing costs and cheap equipment that various aspects of advantages are applied to overcome present issues in conventional technology.

Figures 1A, 1B, 1C:
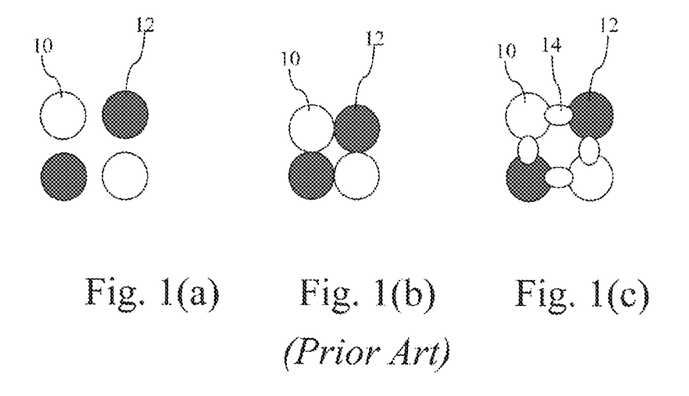
FIGS. 1(a)-1(c) show schematic diagrams respectively illustrating various mixing types regarding silica molecules and titania molecules in the silica/titania hybrid film in the prior art.

FIG. 1(a) to FIG. 1(c) show schematic diagrams respectively illustrating various mixing types regarding silica molecules and titania molecules in the silica/titania hybrid film in the prior art; FIG. 1(a) shows a mixed state that there is none of chemical bonds existing between $SiO_2$ molecules 10 and $TiO_2$ molecules 12 and the $SiO_2$ molecules 10 and $TiO_2$ molecules 12 exist in the film in a mixture state; FIG. 1(b) shows that $SiO_2$ molecules 10 and $TiO_2$ molecules 12 are bonded with each other through chemical bonds; and FIG. 1(c) shows that $SiO_2$ molecules 10 and $TiO_2$ molecules 12 are bonded with each other through the organic molecules 14 acting as interface adhesive substance.

However, whether it is a mixture of FIG. 1(a), the chemical bonding of FIG. 1(b) or the interfacial adhesion mixing state of FIG. 1(c), the colloidal particles cannot be stacked tightly issues are existing. The film surface is not fine-scale morphology under microscopic view, and the obvious defects of non-uniform structure and different chemical constitutions of the film need to be further improved.

There is a need to solve the above deficiencies/issues.

SUMMARY

In accordance with one more aspect of the present invention, a method of manufacturing an inorganic-organic hybrid oxide polymer is provided, which includes the steps of providing a first precursor comprising an oxide of first element M and an organic molecule cluster OG and a second precursor comprising an oxide of second element N, wherein the first element M is one selected from a group consisting of a transition element group, a metal element group, a semiconductor group and the combination thereof, the second element N is one selected from a group consisting of a transition element group, a metal element group, a semiconductor group and the combination thereof, and the first element M is different from the second element N; causing the first precursor and the second precursor to perform a cohydrolysis-condensation reaction to form a polymer; and placing the polymer in an environment with a temperature ranged between 50° C. and 100° C. and a pressure condition equal to or less than or 1 atm for lasting one hour to form a hybrid oxide $M_xN_yO_z$ based on the first element M and a second element N, wherein the hybrid oxide $M_xN_yO_z$ has plurality of voids, the plurality of voids have an average featured diameter in a range between 0.2 nm and 30 nm and the organic molecule cluster OG is filled within the voids, so as to synthesize a hybrid oxide organic-inorganic polymer $M_xN_yO_z$/OG based on the first element M and the second element N.

In accordance with another aspect of the invention, an organic-inorganic hybrid oxide polymer is provided, which includes an amorphous organic-inorganic polymer consisting of an inorganic molecule cluster $M_xN_yO_z$ and an organic molecule cluster OG and having a molecular formula of $M_xN_yO_z$/OG, wherein the inorganic molecules cluster $M_xN_yO_z$ consists of a hybrid oxide of a first element M and a second element N and having a molecular formula of $M_xN_yO_z$, wherein x=0.01~0.99, y=0.01~0.99 and z/(x+y)=0.01~3.99, and the inorganic molecule cluster $M_xN_yO_z$ comprises a plurality of voids, wherein the plurality of voids have an average featured diameter in a range between 0.2 nm and 30 nm and the organic molecule cluster OG is filled within the voids, wherein the organic molecule cluster OG has a molecular formula of $(C_xH_yO_z)_n$, wherein x=1~10, y=1~10, z=1~10 and n=1~2000 k, wherein the first element M and the second element N are respectively one selected from a group consisting of a transition element group, a metal element group, a semiconductor group and the combination thereof and the first element M is different from the second element N.

The present disclosure may best be understood through the following descriptions with reference to the accompanying drawings, in which:

DETAILED DESCRIPTION

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "comprising" or "including", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

Reference throughout this specification to "one embodiment" or "an embodiment" means that a particular feature, structure or characteristic described in connection with the embodiment is included in at least one embodiment. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments may be practiced without these specific details. In other instances, well-known methods, structures and techniques have not been shown in detail in order not to obscure an understanding of this description.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

The term "preferably" is non-exclusive, and should be interpreted as "preferred but not limited to". Any steps described or recorded in the descriptions or claims can implement in any order, and are not limited to those described in the claims. The patent scope should be only limited by the claims and the equivalence but not the embodiments.

Embodiment 1

Titanium isopropoxide $(Ti(OC_3H_7)_4$, TTIP) and tetraethoxysilane $(Si-(OC_2H_5)_4$, TEOS) are prepared to be the initial materials, and then prepare 2,4-pentanedione (entane-2,4-dione, acetylacetone, acac), 1-propanol, absolute ethanol, nitric acid and other raw materials.

Mixing 3.1 mmol TTIP, 33.1 mmol 1-propanol and 3.0 mmolacac to prepare titania precursor, which acac as a stabilizer is to reduce the titanium alkoxide activity, because the hydrolysis speed of TTIP is faster than that of TEOS, the stabilization process affects the degree of polymerization of molecular clusters that the hydrolysis rate of both needs to be controlled to be equal; mixing 8.6 mmol TEOS and 103.2 mmol ethanol to prepare the silica precursor.

Mixing the titanium dioxide precursor with the silica precursor, and then adding the deionized water to the mixture to carry out hydrolysis-condensation reaction; controlling the hydrolysis reaction to form a reactive molecular cluster; and then placing the mixture at room temperature (about 25° C.) and continuing stirring for about 48 hours that will react and polymerize the molecular clusters to form a monolithic polymer molecule; selectively adding nitric acid or ammonia during polymerization to gradually adjust the pH to less than 4 or greater than 10, in which the H$_2$O/TTIP ratio (i.e. Rw) of the polymer is about 2, the titanium to silicon relative molar ratio is about 0.36; when the pH value is less than 4, preferably at about 2, a dense film can be finally synthesized, and on the contrary when the pH value is more than 10, preferably at about 12, a porous film can be finally synthesized.

Applying the spin-on coating scheme, a dip coating scheme, a spray scheme, an electrophoresis scheme, a roll coating scheme or similar techniques to coat the polymer on a surface of specific application, e.g., silicon substrate surface, the wafer surface, the quartz substrate surface and so on to form a polymer film on the surfaces. Executing a drying process of putting the coated substrate on a hot plate, and then placing it in the environment of the temperature is between 50° C.~100° C. and the pressure is equal to or less than 1 atm for more than 1 hour; Heating the coated substrate at the environment continuously for more than 1 hour to complete the manufacture of polymer films on a specific application surface.

Figure 2:
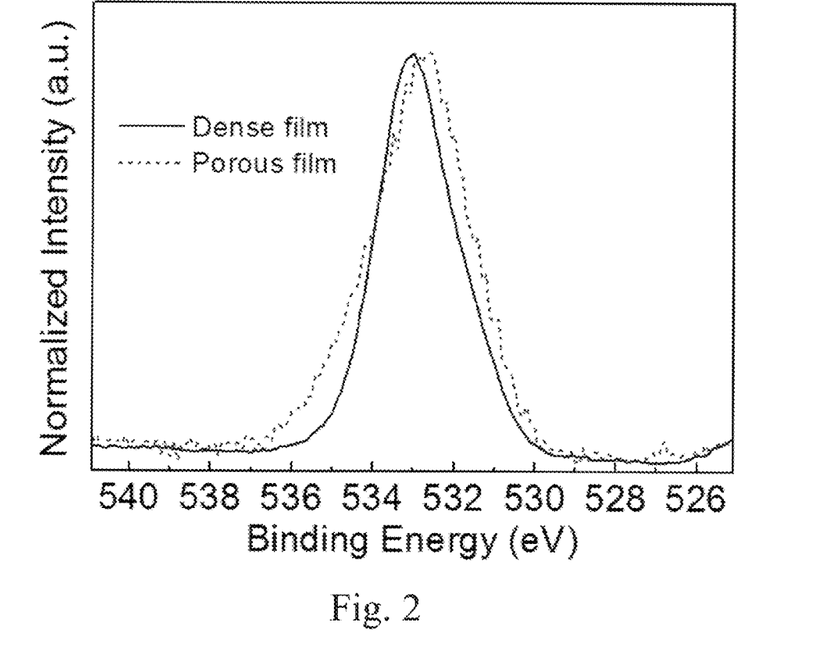
FIG. 2 shows a chemical shift spectra diagram illustrating the normalized binding energy for both the dense film and the porous film in accordance with the present invention.
Figure 3A:
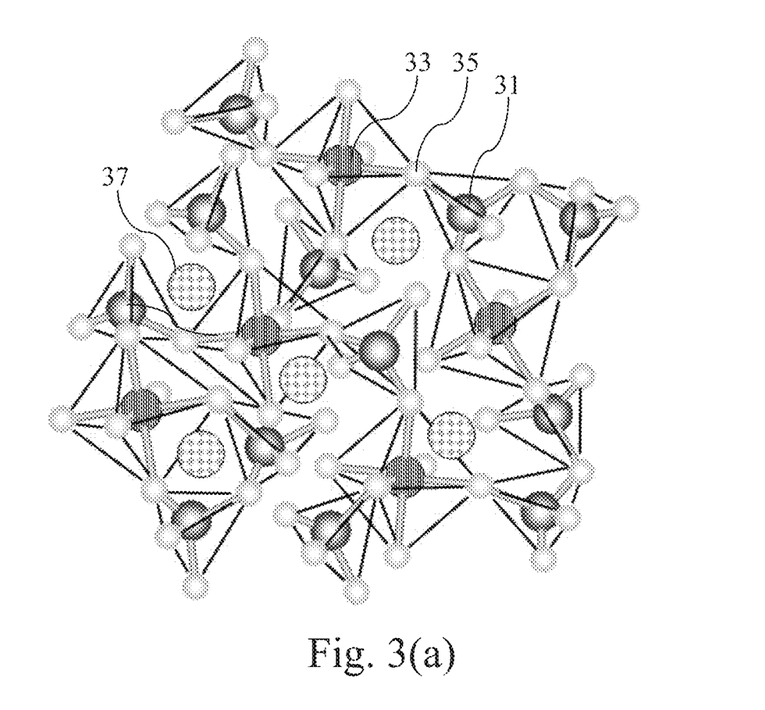
FIG. 3(a) shows a molecular configuration for the $(Ti_xSi_y)O_z$/2,4-pentanedione (acetylacetone, entane-2,4-dione, acetylacetone, acac) polymer in accordance with the present invention.
Figure 3B:
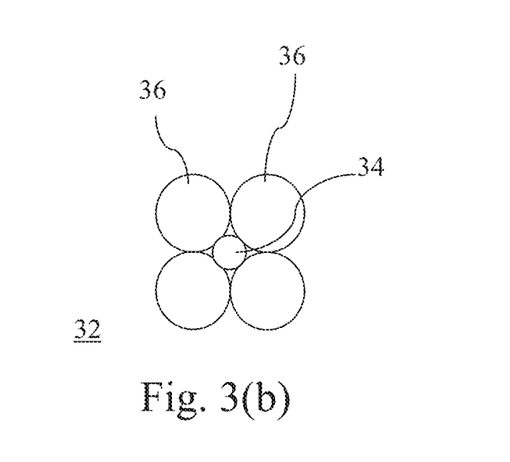
FIG. 3(b) show a schematic diagram illustrating a formation for the $(Ti_xSi_y)O_z$/2,4-pentanedione (acetylacetone, entane-2,4-dione, acetylacetone, acac) polymer in accordance with the present invention.

The present embodiment selectively takes advantage of spin-on coating technique that selectively forms a dense polymer film on the quartz substrate surface at rotational speed of 1,000 rpm~2,000 rpm, and control the thickness of the film in the range of 500 nm~800 nm, in order to further observe and measure the characteristics in all aspects of the polymerization, such as optics, physics and chemical. The polymer can be identified and confirmed to be an amorphous inorganic—organic polymer through the X-ray photoelectron spectroscopy (XPS) measure technology which has the formula of $(Ti_xSi_y)O_z$/2,4-pentanedione (acetylacetone, entane-2,4-dione, acetylacetone, acac), wherein x=0.2~0.4, y=0.6~0.8 and z/(x+y)=1.5~1.9, and a preferable embodiment is $(TiSi)_{1.01}O_{1.84}$. The X-ray photoelectron spectra for $(Ti_xSi_y)O_z$/2,4-pentanedione (acetylacetone, entane-2,4-dione, acetylacetone, acac) is shown in FIG. 2. The molecular configuration for $(Ti_xSi_y)O_z$/2,4-pentanedione (acetylacetone, entane-2,4-dione, acetylacetone, acac) is shown in FIG. 3(a) and FIG. 3(b). FIG. 2 shows two curves of the chemical shift spectra, wherein one is the chemical shift spectrum curve of the dense film, the other is the chemical shift spectrum plot diagram for the porous film. It is observed that dense film or porous film is both with strong Si—O—Ti bonds, but the dense film has more Si—O—Ti bonds than porous film.

FIG. 3(a) shows a molecular configuration for the $(Ti_xSi_y)O_z$/2,4-pentanedione (acetylacetone, entane-2,4-dione, acetylacetone, acac) polymer in accordance with the present invention. In FIG. 3(a), the silicon (Si) molecules 31 and titanium (Ti) molecules 33 jointly bond with the oxygen (0) molecules 35 to form an inorganic molecule $(Ti_xSi_y)O_z$, and the organic molecules 37, 2,4-pentanedione (acetylacetone, entane-2,4-dione, acetylacetone, acac), filled in the voids which is formed by the polymerization of a plurality of inorganic molecules $(Ti_xSi_y)O_z$. The polymer $(Ti_xSi_y)O_z$/2, 4-pentanedione (acetylacetone, entane-2,4-dione, acetylacetone, acac) in accordance with this invention could be observed from FIG. 3(a) that the inorganic molecules $(Ti_xSi_y)O_z$ is formed by the chemical bonding between Ti, Si, and O, and the organic molecules 2,4-pentanedione (acetylacetone, entane-2,4-dione, acetylacetone, acac) filled in entire voids among the inorganic molecules $(Ti_xSi_y)O_z$ to form an organic-inorganic hybrid oxide polymer; It is to be noticed that neither TiO$_2$, SiO$_2$ and any ratio of TiO$_2$—SiO$_2$ mixture nor any materials bonds with Si—O—Ti remain in the polymer, that is to say, it can reach more than 99% purity. FIG. 3(b) schematically shows, in terms of micro view, the organic-inorganic hybrid oxide polymer 32 that the organic molecules 2,4-pentanedione (acetylacetone, entane-2,4-dione, acetylacetone, acac) 34, filled in the void among the inorganic molecules $(Ti_xSi_y)O_z$ 36.

Figure 4A:
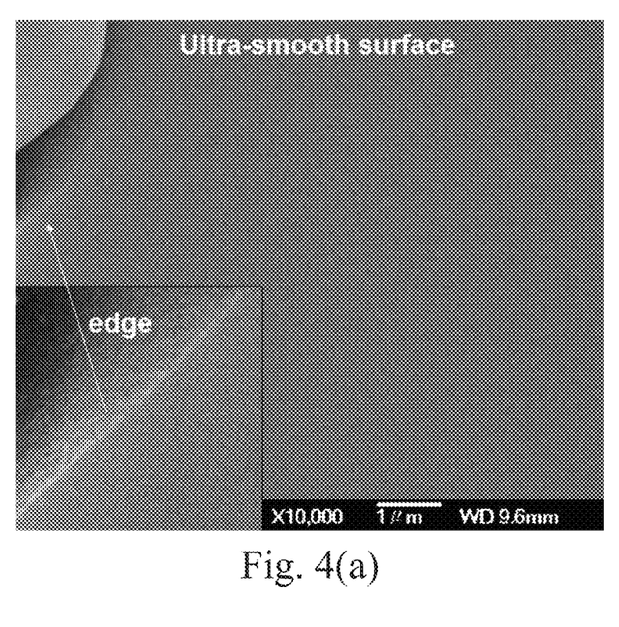
FIG. 4(a) shows an image demonstrating the dense film structure of the $(Ti_xSi_y)O_z$/2,4-pentanedione (acetylacetone, entane-2,4-dione, acetylacetone, acac) polymer at the surface and the cutting edge in accordance with the present invention obtained by the observation of a scanning electron microscope.
Figure 4B:
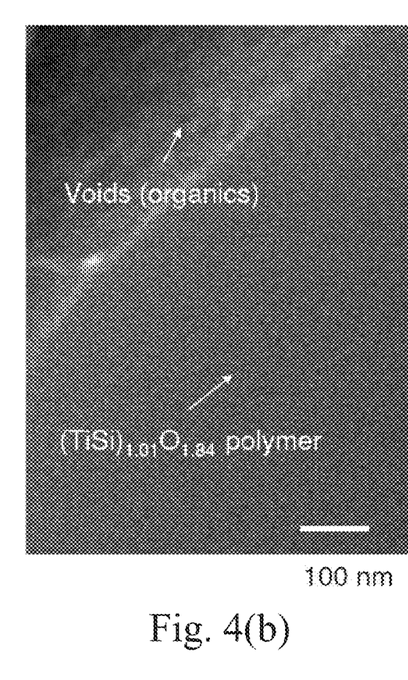
FIGS. 4(b) and 4(c) show magnified images for the cutting edges of the dense film structure shown in FIG. 4(a) obtained by the observation of a scanning electron microscope.
Figure 4C:
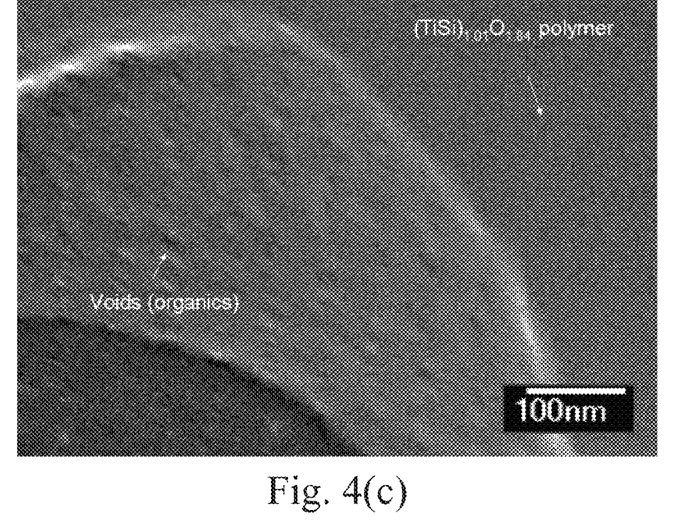
Figure 4D:
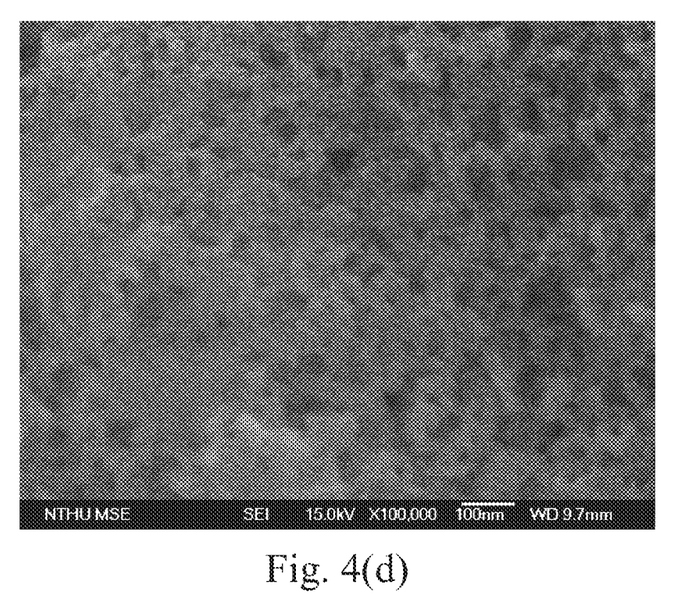
FIG. 4(d) shows an image demonstrating the porous film structure of the $(Ti_xSi_y)O_z$/2,4-pentanedione (acetylacetone, entane-2,4-dione, acetylacetone, acac) polymer at the surface in accordance with the present invention obtained by the observation of a scanning electron microscope.

FIG. 4(a) shows an image demonstrating the dense film structure of the $(Ti_xSi_y)O_z$/2,4-pentanedione (acetylacetone, entane-2,4-dione, acetylacetone, acac) polymer at the surface and the cutting edge in accordance with the present invention obtained by the observation of a scanning electron microscope. FIG. 4(b) and FIG. 4(c) show magnified images for the cutting edges of the dense film structure shown in FIG. 4(a) obtained by the observation of a scanning electron microscope. FIG. 4(d) shows an image demonstrating the porous film structure of the $(Ti_xSi_y)O_z$/2,4-pentanedione (acetylacetone, entane-2,4-dione, acetylacetone, acac) polymer at the surface in accordance with the present invention obtained by the observation of a scanning electron microscope. According to FIG. 4(a), an ultra-smooth surface of the dense film of the $(Ti_xSi_y)O_z$/2,4-pentanedione (acetylacetone, entane-2,4-dione, acetylacetone, acac) polymer synthesized in the present invention can be seen, that is to say, the surface is relatively less rough and the surface roughness Ra<10 nm and has a very dense molecular structure. It is to be noticed that from FIG. 4(a) any small cracks or defects on the surface of the dense film was not observed; according to FIG. 4(b) and FIG. 4(c), the 2,4-pentanedione (acetylacetone, entane-2,4-dione, acetylacetone, acac) organic molecule is filled in the voids among $(Ti_xSi_y)O_z$ inorganic molecule clusters, and only little voids remained in the $(Ti_xSi_y)O_z$ inorganic molecule clusters which are filled by 2,4-pentanedione (acetylacetone, entane-2,4-dione, acetylacetone, acac) organic molecules, for the reason that the $(Ti_xSi_y)O_z$/2,4-pentanedione (acetylacetone, entane-2,4-dione, acetylacetone, acac) polymer itself may have a relatively dense composition; according to FIG. 4(d), the porous film has a relatively rough surface and more coarse molecular structure.

According to the actual measuring the dense film of the present invention, the volume percentage of entire voids of the whole polymer is preferably between 0.01% to 1%, and the mean characteristics diameter size of the voids is between 0.2 nm~30 nm, preferably between 0.5 nm~20 nm. The receptive voids have a shape most close to circular but not circular that the mean characteristics diameter size of the voids is the diameter which regarded the voids as the nearest circle. The organic molecule 2,4-pentanedione (acetylacetone, entane-2,4-dione, acetylacetone, acac) filled in the voids among inorganic molecule clusters $(Ti_xSi_y)O_z$, in fact, can be further decomposed using high-temperature pyrolysis method after the film being formed, and then it eliminates from the inorganic molecule clusters $(Ti_xSi_y)O_z$ that the pure inorganic molecule clusters $(Ti_xSi_y)O_z$ remains, in which the inorganic molecule clusters $(Ti_xSi_y)O_z$ occupy more than 99% over the entire polymer; through actual measurements, the dense film in accordance with the present invention has a hardness equal to or greater than pencil hardness 9H.

Figure 5:
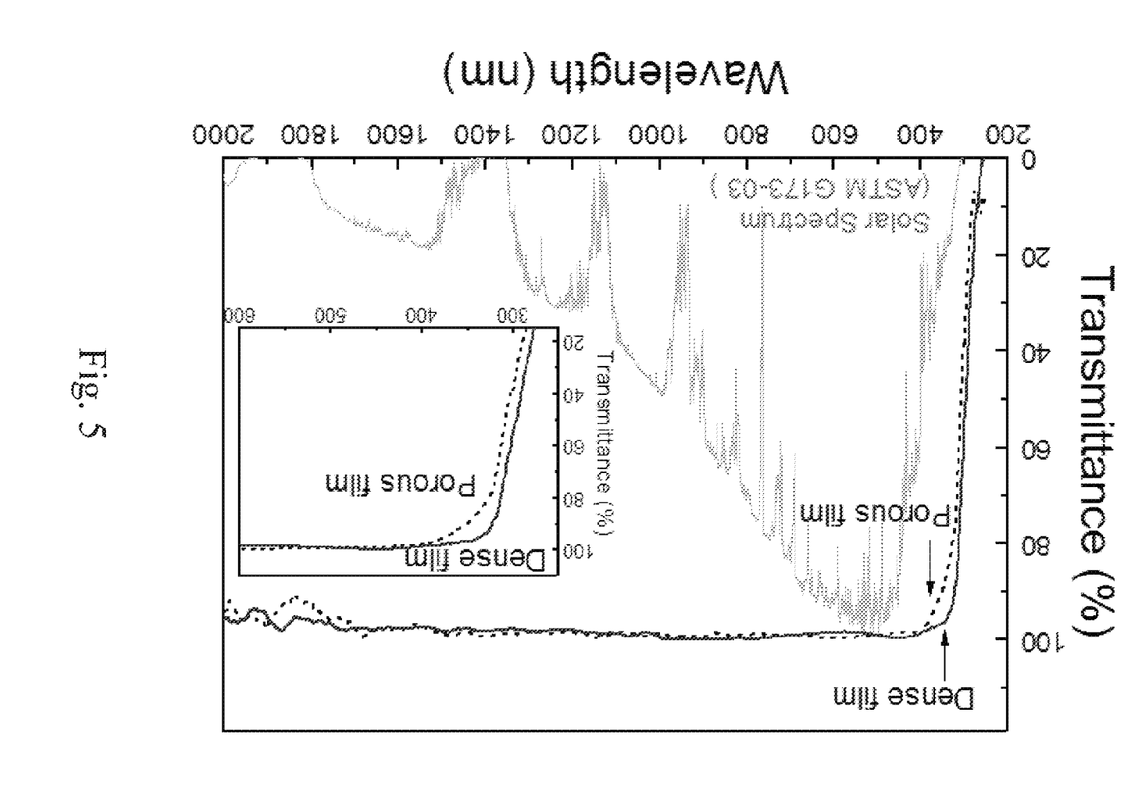
FIG. 5 shows an AM1.5 solar spectrum for the $(Ti_xSi_y)O_z$/2,4-pentanedione (acetylacetone, entane-2,4-dione, acetylacetone, acac) polymer dense film in accordance with the present invention.

In view of the titanium-silicon films are widely applied in the optics field, in the present embodiment, a spin-on coating technique of forming a 720 nm thickness single layer $(Ti_xSi_y)O_z$/2,4-pentanedione (acetylacetone, entane-2,4-dione, acetylacetone, acac) polymer film on the quartz plate is further applied. The polymer films of dense film and porous film are produced individually and the thickness of both films are controlled to be between 500 nm~800 nm to further measure the optical properties. FIG. 5 shows an AM1.5 solar spectrum for the $(Ti_xSi_y)O_z$/2,4-pentanedione (acetylacetone, entane-2,4-dione, acetylacetone, acac) polymer dense film in accordance with the present invention. According to FIG. 5, the hybrid oxide polymer film of the present invention, either dense film DN or porous film PO, has an average light transmittance of 98% in the wavelength range of 400 nm~1,600 nm, and the dense film DN has a better transmittance than porous PO film in the short wavelength (<400 nm) range.

Figure 6A:
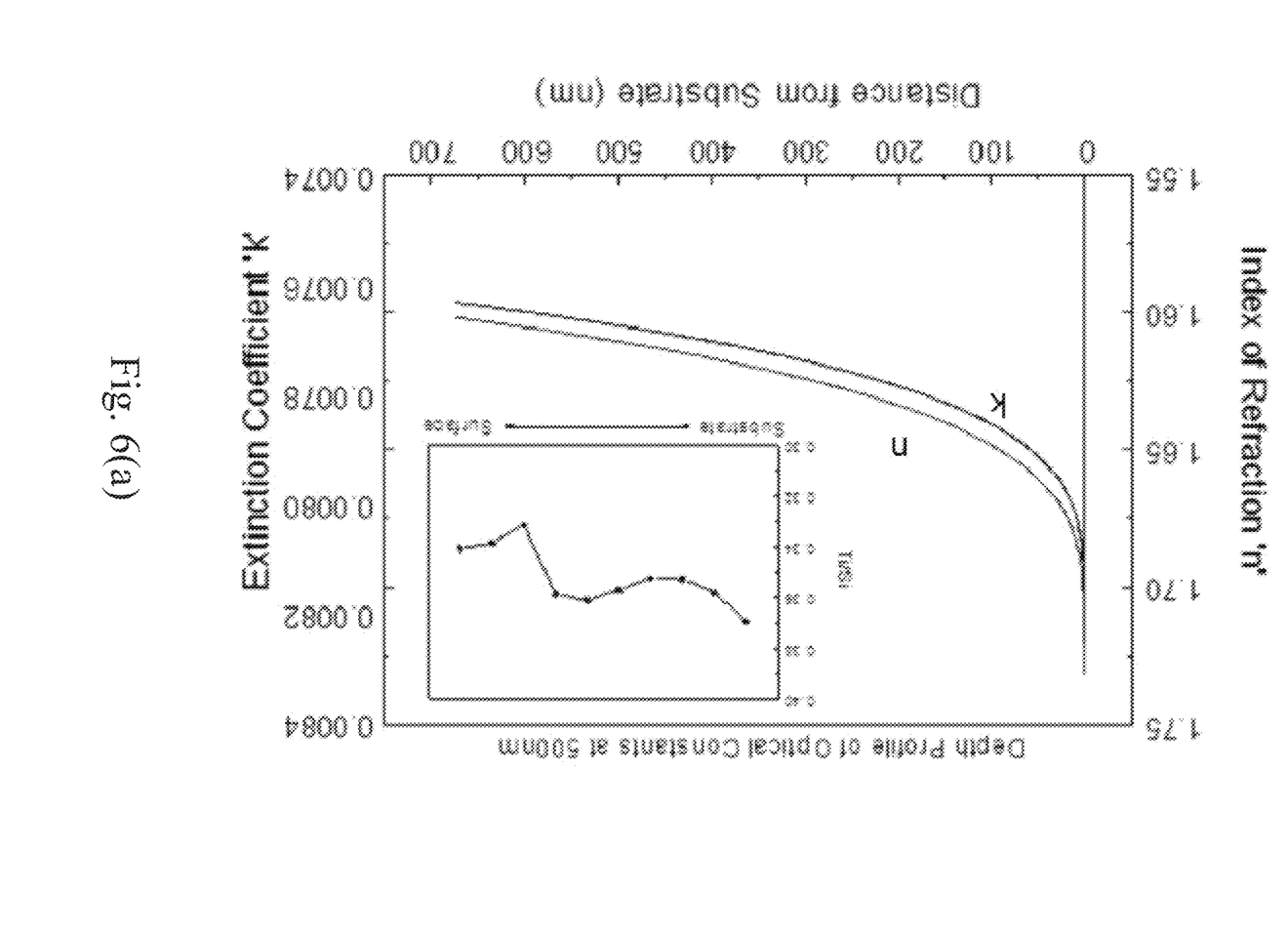
FIG. 6(a) shows a plot diagram illustrating the refractive index n and extinction coefficient k with respect to the distance from the surface to the interface of the substrate for the dense film in accordance with the present invention.
Figure 6B:
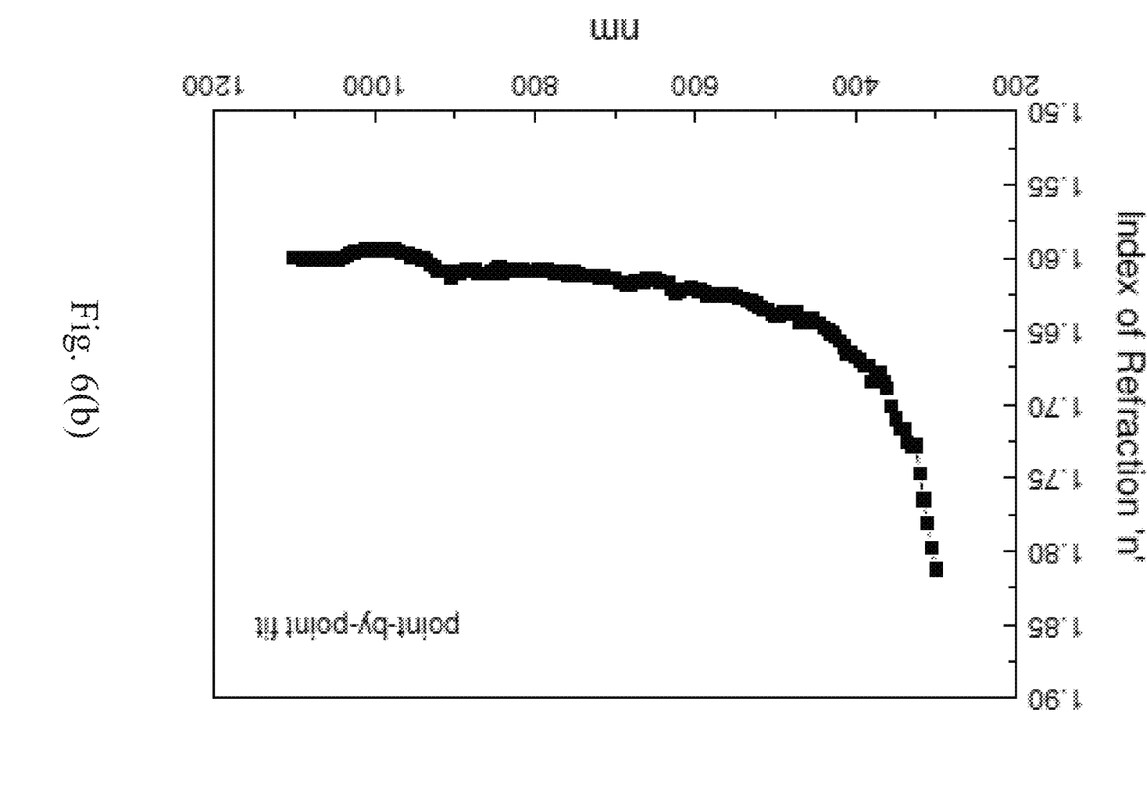
FIG. 6(b) shows a plot diagram illustrating the refractive index to the light wavelength for the dense film in accordance with the present invention.

FIG. 6(a) shows a plot diagram illustrating the refractive index n and extinction coefficient k with respect to the distance from the surface to the interface of the substrate for the dense film in accordance with the present invention. According to FIG. 6(a), the refractive index n and extinction coefficient k to the distance from the surface to the interface of the substrate distribution curve, in the film thickness of 670 nm and light wavelength 500 nm conditions, the film has a gradient refractive index which is lower at the end of air (approximately 1.6), higher at the end of the substrate (approximately 1.7) and can be controlled by the composition of titanium and silicon of the films. FIG. 6(b) shows a plot diagram illustrating the refractive index to the light wavelength for the dense film in accordance with the present invention. According to FIG. 6(b), under the conditions of the light wavelength greater than 400 nm, the measured refractive index of the polymer film of the present invention is between 1.5~1.7. In this embodiment, to find a better refractive index for the anti-reflective feature of present invention, can further adjust the proportion of Ti to Si in the $(Ti_xSi_y)O_z$/2,4-pentanedione (acetylacetone, entane-2,4-dione, acetylacetone, acac) hybrid oxide polymer, i.e. adjusting the proportion of x to y, to adjust the refractive index of the $(Ti_xSi_y)O_z$/2,4-pentanedione (acetylacetone, entane-2,4-dione, acetylacetone, acac) hybrid oxide polymer.

Figure 7:
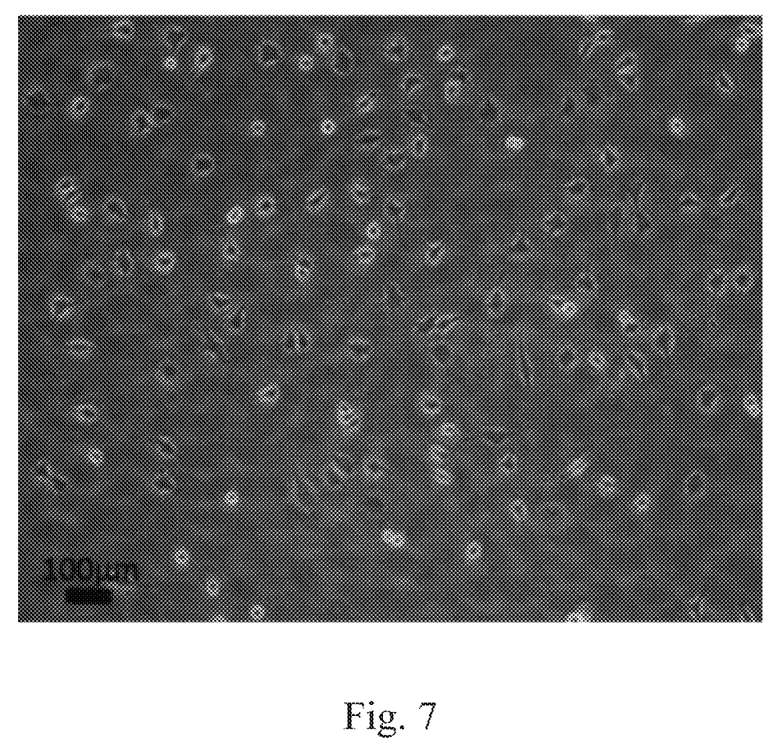
FIG. 7 shows an image demonstrating the porous film acting as a biocompatible substrate in accordance with the present invention.

The porous film in accordance with the present invention can be used as the biocompatible substrate. FIG. 7 shows an image demonstrating the porous film acting as a biocompatible substrate in accordance with the present invention. A porous film made by the method in the present invention can be used as the biocompatible substrate, since its rough surface is particularly accommodated to the bio-cell growth. According to the image shown in FIG. 7, cells grow well on the surface of the porous film.

That is to say, the present embodiment made Ti, Si and O in the amorphous state completely bonding to each other to form an inorganic compound through the low-temperature Sol-gel process. The 2,4-pentanedione (acetylacetone, entane-2,4-dione, acetylacetone, acac) organic molecules are filled in the voids among the inorganic molecules, to form the $(Ti_xSi_y)O_z$/2,4-pentanedione (acetylacetone, entane-2,4-dione, acetylacetone, acac) inorganic-organic polymer finally, which is an compounded organic-inorganic polymer on the basis of hybrid oxide, wherein the 2,4-pentanedione (acetylacetone, entane-2,4-dione, acetylacetone, acac) is selectively decomposed to form the inorganic hybrid oxide clusters $(Ti_xSi_y)O_z$ finally.

Embodiment 2

The manufacturing method as described in embodiment 1 is to be implemented, but silicon Si element is replaced by by iron (Fe) element. Finally the polymer of $(Ti_xFe_y)O_z$/organic molecules is synthesized. Through the X-ray photoelectron spectroscopy (XPS) measurement technique, the polymer of $(Ti_xFe_y)O_z$/organic molecules can be identified and confirmed as an amorphous inorganic-organic polymer which has the molecular formula of $(Ti_xFe_y)O_z$/organic molecules, wherein x=0.2~0.4, y=0.6~0.8 and z/(x+y)= 1.5~1.9, and a preferable embodiment is $(TiFe)_{2.99}O_{5.76}$/ organic molecules, wherein the organic molecules can be removed by thermal-pyrolysis; FIG. 7 shows an image demonstrating the dense film structure of the $(Ti_xFe_y)O_z$/ organic molecules polymer at the surface and the cutting edge in accordance with the present invention obtained by the observation of a scanning electron microscope. According to FIG. 7, an ultra-smooth surface of the dense film of the $(Ti_xFe_y)O_z$/organic molecules polymer synthesized in the present invention can also be seen, that is to say, the surface is relatively less rough and the surface roughness Ra<1.0 nm and has a very dense molecular structure, and any small cracks or defects on the surface of the dense film was not also observed.

The present invention is the implementation of forming a polymer of inorganic hybrid oxide ($M_xN_yO_z$ and organic molecule cluster OG which is on the basis of the first element M and the second element N, wherein has the formula of ($M_xN_y)O_z$/OG, through the low-temperature hydrolysis polymerization reaction technology. The polymer is neither a conventional technology of the mixture of the oxide MO of the first element and the oxide NO of the second element, nor is it substances including different proportions of MO-NO mixtures and M—O—N bonds, that is to say, the content ratio of ($M_xN_y)O_z$ inorganic molecule clusters of the present invention can be more than 99.9% over the entire polymer.

The inorganic-organic hybrid oxide polymer according to the present invention has the superior characteristics of both the organic and inorganic components, such as characteristics of high tensile modulus, scratch resistance, thermal stable, good dimensional stability and so on which an inorganic component owns, and characteristics of toughness, flexibility, lightweight and so on which an organic component owns. Although the polymer in the present invention is in an amorphous state, but still owns the form of fine-scale morphology owing to the reason the excellent optical characteristic through actual measurement it has.

The inorganic-organic hybrid film according to the present invention can be widely used in the field of optics, e.g., a high refractive index film, an optical waveguide component, a nonlinear optical material and various optical protective layers, and can be further used as biological composite materials, e.g. a biocompatible substrate.

There are more embodiments provided as follows.

Embodiment 1 a method of manufacturing an inorganic-organic hybrid oxide polymer includes the steps of providing a first precursor comprising an oxide of first element M and an organic molecule cluster OG and a second precursor comprising an oxide of second element N, wherein the first element M is one selected from a group consisting of a transition element group, a metal element group, a semiconductor group and the combination thereof, the second element N is one selected from a group consisting of a transition element group, a metal element group, a semiconductor group and the combination thereof, and the first element M is different from the second element N; causing the first precursor and the second precursor to perform a cohydrolysis-condensation reaction to form a polymer; and placing the polymer in an environment with a temperature ranged between 50° C. and 100° C. and a pressure condition equal to or less than or 1 atm for lasting one hour to form a hybrid oxide $M_xN_yO_z$, based on the first element M and a second element N, wherein the hybrid oxide $M_xN_yO_z$ has plurality of voids, the plurality of voids have an average featured diameter in a range between 0.2 nm and 30 nm and the organic molecule cluster OG is filled within the voids, so as to synthesize a hybrid oxide organic-inorganic polymer $M_xN_yO_z$/OG based on the first element M and the second element N.

Embodiment 2 the method according to embodiment 1 further includes the steps of providing a substrate; causing the first precursor and the second precursor to perform a cohydrolysis-condensation reaction to form a polymer; selectively mixing one of an acid or an alkali into the polymer; causing the polymer to form a film on the substrate by a spin-on coating scheme; placing the film in an environment with a temperature ranged between 50° C. and 100° C. and a pressure condition equal to or less than or 1 atm for lasting one hour to form a hybrid oxide $M_xN_yO_z$/OG film based on the first element M and the second element N; and heating the hybrid oxide $M_xN_yO_z$/OG film by a relatively high temperature to decompose the organic molecule cluster OG.

Embodiment 3 the method according to embodiment 2 further includes the step of selectively mixing one of an acid or an alkali into the polymer to respectively form a relatively high dense film or a relatively coarse film.

Embodiment 4 an organic-inorganic hybrid oxide polymer includes an amorphous organic-inorganic polymer consisting of an inorganic molecule cluster $M_xN_yO_z$ and an organic molecule cluster OG and having a molecular formula of $M_xN_yO_z$/OG, wherein the inorganic molecules cluster $M_xN_yO_z$ consists of a hybrid oxide of a first element M and a second element N and having a molecular formula of $M_xN_yO_z$, wherein x=0.01~0.99, y=0.01~0.99 and z/(x+y)=0.01~3.99, and the inorganic molecule cluster $M_xN_yO_z$ comprises a plurality of voids, wherein the plurality of voids have an average featured diameter in a range between 0.2 nm and 30 nm and the organic molecule cluster OG is filled within the voids, wherein the organic molecule cluster OG has a molecular formula of $(C_xH_yO_z)_n$, wherein x=1~10, y=1~10, z=1~10 and n=1~2000 k, wherein the first element M and the second element N are respectively one selected from a group consisting of a transition element group, a metal element group, a semiconductor group and the combination thereof and the first element M is different from the second element N.

Embodiment 5 the polymer according to embodiment 4 is made by one of the following method: the method as presented in the embodiment 1 and a wet chemical process which controls the reaction rate of hydrolyzing the precursor to a molecule cluster and controls the mutual reaction among the molecule clusters.

Embodiment 6 the polymer according to embodiment 4, the organic molecule cluster OG is a 2,4-pentanedione (acetylacetone, entane-2,4-dione, acetylacetone, acac) organic molecule.

Embodiment 7 the polymer according to embodiment 4, the first element M and the second element N are respectively one selected from a group consisting of a silicon (Si) element, a titanium (Ti) element, an iron (Fe) element, a zirconium (Zr) element, an aluminum (Al) element, a lanthanum (La) element, a lutetium (Lu) element, a strontium (Sr) element, a ruthenium (Ru) element, a zinc (Zn) elements, a cadmium (Cd) element, a copper (Cu) elements, a silver (Ag) elements, a gold (Au) elements, a nickel (Ni) element, a platinum (Pt) elements, a palladium (Pd) element, a vanadium (V) elements, a molybdenum (Mo) element, a selenium (Se) element, a germanium (Ge) element, gallium (Ga) element, an indium (In) element, a sulfur (S) element, a tin (Sn) and the combinations thereof.

Embodiment 8 the polymer according to embodiment 7, the first element M is the titanium (Ti) element, the second element N is the silicon (Si) element, x=0.2~0.4, y=0.6~0.8 and z/(x+y)=1.5~1.9 and the hybrid oxide organic-inorganic polymer has a molecular formula of $(TiSi)_{1.01}O_{1.84}$/acac.

Embodiment 9 the polymer according to embodiment 7, the first element M is the titanium (Ti) element, the second element N is the iron (Fe) element, x=0.3~0.5, y=0.5~0.7 and z/(x+y)=1.3~1.8 and the hybrid oxide organic-inorganic polymer has a molecular formula of $(TiFe)_{2.99}O_{5.76}$/acac.

Embodiment 10 the polymer according to embodiment 4 further includes one of the following characteristics: the inorganic molecules cluster $M_xN_yO_z$ occupying more than 99% over the entire polymer; the volume percentage of the voids with respect to the entire polymer being in a range between 0.01% and 1%; the plurality of voids having a average featured diameter in a range between 0.5 nm and 20 nm; and the polymer having the hardness equal to or greater than a pencil hardness 9H.

While the disclosure has been described in terms of what are presently considered to be the most practical and preferred embodiments, it is to be understood that the disclosure need not be limited to the disclosed embodiment. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An organic-inorganic hybrid oxide polymer, comprising:
   an amorphous organic-inorganic polymer consisting of an inorganic molecule cluster $M_xN_yO_z$ and an organic molecule cluster OG and having a molecular formula of $M_xN_yO_z$/OG, wherein
   the inorganic molecules cluster $M_xN_yO_z$ consists of a hybrid oxide of a first element M, a second element N and an oxide element O and having a molecular formula of $M_xN_yO_z$, wherein x=0.01-0.99, y=0.01-0.99 and z/(x+y)=0.01-3.99, and the inorganic molecule cluster $M_xN_yO_z$ comprises a plurality of voids, wherein the plurality of voids have an average featured diameter in a range between 0.2 nm and 30 nm and the organic molecule cluster OG is filled within the voids, wherein
the organic molecule cluster OG has a molecular formula of $(C_aH_bO_c)_n$, wherein a=1-10, b=1-10, c=1-10 and n=1-2000 k, wherein
the first element M and the second element N are respectively one selected from a group consisting of a transition element group, a metal element group, a semiconductor group and the combination thereof, the first element M is different from the second element N, the bonding configurations among the first element M, the second element N and the oxide element O include a bonding form of M—O—N, and the amorphous organic-inorganic polymer has a surface roughness less than 10 nm.

2. The polymer according to claim 1 being made by the following method:
a wet chemical process which controls the reaction rate of hydrolyzing the precursor to a molecule cluster and controls the mutual reaction among the molecule clusters.

3. The polymer according to claim 1, wherein the organic molecule cluster OG is a 2,4-pentanedione (acetylacetone, entane-2,4-dione, acetylacetone, acac) organic molecule.

4. The polymer according to claim 1, wherein the first element M and the second element N are respectively one selected from a group consisting of a silicon (Si) element, a titanium (Ti) element, an iron (Fe) element, a zirconium (Zr) element, an aluminum (Al) element, a lanthanum (La) element, a lutetium (Lu) element, a strontium (Sr) element, a ruthenium (Ru) element, a zinc (Zn) elements, a cadmium (Cd) element, a copper (Cu) elements, a silver (Ag) elements, a gold (Au) elements, a nickel (Ni) element, a platinum (Pt) elements, a palladium (Pd) element, a vanadium (V) elements, a molybdenum (Mo) element, a selenium (Se) element, a germanium (Ge) element, gallium (Ga) element, an indium (In) element, a sulfur (S) element, a tin (Sn) and the combinations thereof.

5. The polymer according to claim 4, wherein the first element M is the titanium (Ti) element, the second element N is the silicon (Si) element, x=0.2-0.4, y=0.6-0.8 and z/(x+y)=1.5-1.9 and the hybrid oxide organic-inorganic polymer has a molecular formula of $(TiSi)_{1.01}O_{1.84}/acac$.

6. The polymer according to claim 4, wherein the first element M is the titanium (Ti) element, the second element N is the iron (Fe) element, x=0.3-0.5, y=0.5-0.7 and z/(x+y)=1.3-1.8 and the hybrid oxide organic-inorganic polymer has a molecular formula of $(TiFe)_{2.99}O_{5.76}/acac$.

7. The polymer according to claim 1 further comprising one of the following characteristics:
the inorganic molecules cluster $M_xN_yO_z$ occupying more than 99% over the entire polymer;
the volume percentage of the voids with respect to of the entire polymer being in a range between 0.01% and 1%;
the plurality of voids having a average featured diameter in a range between 0.5 nm and 20 nm; and
the polymer having the hardness equal to or greater than a pencil hardness 9H.

* * * * *